US009979151B2

(12) United States Patent
Loncar et al.

(10) Patent No.: US 9,979,151 B2
(45) Date of Patent: May 22, 2018

(54) CRIMPING TOOL

(71) Applicant: YAZAKI EUROPE LTD., Hemel Hempstead, Hertfordshire (GB)

(72) Inventors: Zelimir Loncar, Sesvete-Zagreb (HR); Ivan Trgovcic, Barilovic (HR); Ozren Milazzi, Zagreb (HR); Vedran Kovac, Zagreb (HR)

(73) Assignee: YAZAKI EUROPE LTD., Hertfordshire (GB)

( * ) Notice: Subject to any disclaimer, the term of this patent is extended or adjusted under 35 U.S.C. 154(b) by 339 days.

(21) Appl. No.: 14/612,546

(22) Filed: Feb. 3, 2015

(65) Prior Publication Data
US 2015/0229091 A1    Aug. 13, 2015

(30) Foreign Application Priority Data

Feb. 7, 2014  (EP) .................... 14154336

(51) Int. Cl.
*H01R 43/058*  (2006.01)
*B21D 39/04*   (2006.01)
*B23P 11/00*   (2006.01)

(52) U.S. Cl.
CPC ......... *H01R 43/058* (2013.01); *B21D 39/048* (2013.01); *B23P 11/005* (2013.01); *H01R 43/0585* (2013.01); *Y10T 29/53226* (2015.01)

(58) Field of Classification Search
CPC .. H01R 43/058; H01R 43/0585; H01R 43/00; H01R 43/048; Y10T 29/5367;
(Continued)

(56) References Cited

U.S. PATENT DOCUMENTS 2,921,618 A   1/1960   Fuller
5,353,623 A  10/1994   Bobenhausen
(Continued)

FOREIGN PATENT DOCUMENTS

DE   198 14 474 C1      7/1999
DE   19814474 C1 *      7/1999   ........... B21D 39/048
(Continued)

OTHER PUBLICATIONS

Original merged document DE19814474C1 to Schröck: heretofore referred to as Schroeck is attached.*
(Continued)

*Primary Examiner* — Peter DungBa Vo
*Assistant Examiner* — John S Lowe
(74) *Attorney, Agent, or Firm* — Sughrue Mion, PLLC

(57) ABSTRACT

Crimping tool including a first tool part having a first crimping die and a plurality of first crimping elements, a second tool part having a second crimping die and a plurality of second crimping elements, a first actuator being movable relative to the first crimping die along an actuation axis perpendicular to a longitudinal axis, wherein the first actuator actuates the first crimping elements moving the first crimping elements in a radial direction, and a second actuator being movable relative to the second crimping die along the actuation axis, wherein the second actuator actuates the second crimping elements moving the second crimping elements in a radial direction, wherein a subset of the first crimping elements and a subset of the second crimping elements are moved consecutively by moving the first actuator and second actuator.

13 Claims, 4 Drawing Sheets

(58) Field of Classification Search
CPC ......... Y10T 29/49183; Y10T 29/49185; Y10T 29/53235; Y10T 29/53226; Y10T 29/53987; B21D 39/048; B23P 11/005
See application file for complete search history.

(56) References Cited

U.S. PATENT DOCUMENTS

| | | | |
|---|---|---|---|
| 6,257,042 B1 * | 7/2001 | Valimaki | B21D 39/048 29/237 |
| 7,748,108 B2 | 7/2010 | Cassar | |

FOREIGN PATENT DOCUMENTS

| | | |
|---|---|---|
| DE | 103 43 837 B3 | 6/2005 |
| FR | 1 316 151 A | 1/1963 |
| JP | 3713629 A | 9/1962 |

OTHER PUBLICATIONS

Machine translation of DE19814474C1 to Schröck: heretofore referred to as Schroeck is attached.*

* cited by examiner

CRIMPING TOOL

BACKGROUND OF THE INVENTION

The subject of the invention is a crimping tool for crimping a contact onto an end of an electric wire. The crimping tool comprises a first tool part having a first crimping die and a plurality of first crimping elements, a second tool part having a second crimping die and a plurality of second crimping elements, at least one first actuator being movable relative to the first crimping die along an actuation axis perpendicular to a longitudinal axis, wherein said at least one first actuator actuates said first crimping elements moving said first crimping elements in a radial direction, and at least one second actuator being movable relative to the second crimping die along said actuation axis, wherein said at least one second actuator actuates said second crimping elements moving said second crimping elements in a radial direction.

Such crimping tools are used for various applications, for instance for attaching a shield connector to the shielding sheath of a shielded cable by a crimping process. One conventional connection between a shielding contact and the shielding sheath is characterized by a dual tubular structure of the shielding connector. One tube, a ferrule, is a separate component and sandwiches the sheath between the ferrule and a tubular part of the shielding connector. Crimping the ferrule around the sheath and the tubular part of a shield connector provides a high retention force and a safe electrical connection.

Such crimping tools are known from FR 1 316 151 A and DE 198 14 474 C1.

Another crimping tool is known from U.S. Pat. No. 5,353,623 A. This crimping tool is used for crimping a ferrule portion of a tube fitting around an elastomeric hose. The tool has an upper and a lower frame. The upper frame has a means for stabilizing an upper die carrier which carries an upper die insert. The lower frame carries a lower die insert. The upper die carrier can be moved along a vertical axis of the tool towards the lower frame. The upper frame and the lower frame can be pivoted to each other to allow a user to open and close the tool. For crimping the ferrule portion of a tube fit-ting around a hose a ferrule portion is positioned onto the hose and inserted into the tool such that the ferrule portion is transversely positioned across the lower die insert. The tool then is closed and the upper die carrier is actuated downwardly along the vertical axis compressing upper and lower die inserts around the ferrule portion. The die inserts comprise several crimping elements which are distributed around the ferrule. Between the crimping elements air gaps are provided wherein elastomeric impact absorbing fillers in the upper and the lower die inserts permit upper and lower die inserts to change shape by a movement in a circumferential direction relative to each other.

Another crimping tool is disclosed in DE 103 43 837 B3 comprising two tool parts for crimping a shield connector onto a shielding sheath and a connector tube. The crimping dies have opposing matrices each providing three rounded ribs which form indents into the shield connector. The crimping dies are moved towards each other along a vertical axis compressing the shielding contact onto the shielding sheath and the inner tubular member of the shielding contact sandwiching the shielding sheath between the tubular member and the shielding contact. When compressing the shielding contact first two ribs, which are arranged side by side to a central ribs, come into contact with the shielding contact. After the ribs, which come into contact with the shielding contact first, have been pressed against the shielding contact, forming indents into the shielding contact, the central ribs also come into contact with the shielding contact.

Both above mentioned crimping tools according to U.S. Pat. No. 5,353,623 A and DE 103 43 837 B3 do not avoid a tangential sliding movement of the crimping tool relative to the shielding contact in the area in which the crimping die contacts the shielding contact in an angle relative to the movement direction of the crimping dies.

Such a relative movement between the tool and the work piece to be crimped is avoided by a crimping tool according to U.S. Pat. No. 7,748,108 B2. The crimping tool includes a ring-shaped cam rotatably mounted about a jaw support. The inner side of the cam forms a track. The jaw support comprises grooves radial to an axis of the jaw support, wherein the cam can be rotated about the axis or the jaw support. Jaws are received within the grooves and can slide in the corresponding groove. The track of the cam is configured to cooperate with ends of the jaws to allow displacement of the jaws radial to the axis of rotation when said cam rotates about the jaw support. For this reason the distance between the track and the axis of rotation changes in circumferential direction so that for crimping the jaws are moved radially towards the axis of rotation by rotating the cam around the jaw support.

SUMMARY OF THE INVENTION

The object of the invention is to provide a crimping tool with first and second tool parts, at least one of which can be moved along an axis so that the tool can be opened and closed and providing a radial movement of the tool parts which are compressing the work piece to be crimped, wherein an enhanced crimping process can be performed.

The object is achieved by a crimping tool comprising a first tool part having a first crimping die and a plurality of first crimping elements, a second tool part having a second crimping die and a plurality of second crimping elements, at least one first actuator being movable relative to the first crimping die along an actuation axis perpendicular to a longitudinal axis, wherein said at least one first actuator actuates said first crimping elements moving said first crimping elements in a radial direction, and at least one second actuator being movable relative to the second crimping die along said actuation axis, wherein said at least one second actuator actuates said second crimping elements moving said second crimping elements in a radial direction, wherein at least one subset of the first crimping elements and at least one subset of the second crimping elements are moved consecutively by moving the first actuator and second actuator.

The crimping tool according to the invention provides for a linear movement between the tool parts so that the crimping tool can be opened and closed for inserting of work pieces of bigger size. In order to avoid as much as possible a sliding movement between the tool and the outer surface of the work piece first and second crimping elements are provided which are movable radially with respect to the longitudinal axis avoiding any tangential movement between the crimping elements and the work piece. Thereby, a better surface quality of the crimping connection is achieved.

The actuators are moved lineally in respect to each other so that the crimping tool can be used in connection with conventional crimping machines pressing two parts in a linear direction. The linear movement of the actuator is transformed in radial movements of the crimping elements. The crimping tool according to the invention can easily be adapted to a manufacturing environment with electrically or hydraulically actuated crimping machines.

At least a subset of the first crimping elements and at least a subset of the second crimping elements are moved consecutively by moving the first and second actuators. In other words, not all of the first crimping elements and second crimping elements are moved coincidently starting to move at the same time.

For opening and closing the crimping dies at least one of the first crimping die and the second crimping die is movable in the direction of the actuation axis. Thereby, the crimping dies can be completely opened in order to enable the insertion even of bigger sized connectors which cannot be inserted into an insertion hole in axial direction with respect to the longitudinal axis. Further, the crimping dies are moved by the same manipulator or machine which actuates the actuator.

The at least one first actuator and the at least one second actuator are movable between a preset position and an actuated position. Preferably, one first actuator for moving all first crimping elements and one second actuator for moving all second crimping elements is provided.

The first and second crimping elements are movable between a retracted position and an emerged position wherein by moving the crimping elements from their retracted position into their emerged position the crimping connection is accomplished.

The first crimping die and the second crimping die each have a recess which together form a receiving hole for holding a work piece to be crimped wherein the work piece is centered on the longitudinal axis when the crimping dies are in a closed position.

In a preferred embodiment one of the first crimping elements is movable along the actuation axis, which is also radial to the longitudinal axis. At least two crimping elements of the first crimping elements are movable along radial axes which are angled to the actuation axis, and which are perpendicular to the longitudinal axis. One of the second crimping elements is movable along the actuation axis, and at least two crimping elements of the second crimping elements are movable along radial axes angled to the actuation axis wherein the radial axes are orientated perpendicular to the actuation axis. Accordingly, the crimping elements are distributed around the longitudinal axis each being movable in a radial direction towards and away in respect to the longitudinal axis. Preferably, all crimping elements are evenly distributed in a circumferential direction around the longitudinal axis.

The first and second crimping elements and the first and second actuators are configured such that during moving the first and second actuators towards their actuated position, the crimping elements, which are movable along radial axes angled to the actuation axis, start to move before the crimping elements, which are movable along the actuation axis, start to move.

Preferably, in this case the first and second crimping elements and the first and second actuators are configured such that during moving the first and second actuators all of the crimping elements, which are movable along radial axes angled to the actuation axis, move coincidently and all of the crimping elements, which are movable along the actuation axis, move coincidently. It is important, that at least diametrically opposed crimping elements move coincidently to make sure that the work piece is crimped evenly.

The crimping tool can further comprise a first housing, which is part of the first tool part, movably receiving the first crimping die. Further, the second tool part can comprise a second housing movably receiving the second crimping die.

At least one of the first tool part and the second tool part is movable along the actuation axis between an open position, a closed position and an actuation position. Thereby, the crimping dies are moved relatively to each other.

In the open position of the tool parts the crimping dies are spaced apart from each other so that a work piece can be inserted between the crimping dies. In addition, the actuators are in their preset positions, so that the crimping elements are in their retracted position. In the closed position of the tool parts the crimping dies are in contact to each other and are closed to each other so that a work piece is held between the crimping dies. The actuators are in their preset positions. In the actuation position of the tool parts the crimping dies have moved with respect to the tool parts and are in contact to each other. By the relative movement between the crimping dies and the tool parts the actuators have been moved to their actuated position so that the crimping elements are moved to their emerged position for crimping a work piece.

For holding the crimping elements the first crimping die comprises a plurality of first guiding holes for receiving the first crimping elements, and the second crimping die comprises a plurality of second guiding holes for receiving the second crimping elements.

For moving the crimping elements the first and second actuators each are provided with at least one thrust face coming into contact with the crimping elements during movement of the first and second actuators towards their actuated position moving the crimping elements towards their emerged positions.

Preferably, the first and second crimping elements are biased towards their retracted position, and the first and second actuators are biased towards their preset position. This can be achieved by spring elements.

BRIEF DESCRIPTION OF THE DRAWINGS

One preferred embodiment of the invention will now be described, by way of example, with reference to the accompanying drawings, wherein.

DETAILED DESCRIPTION OF THE INVENTION

Figure 1:
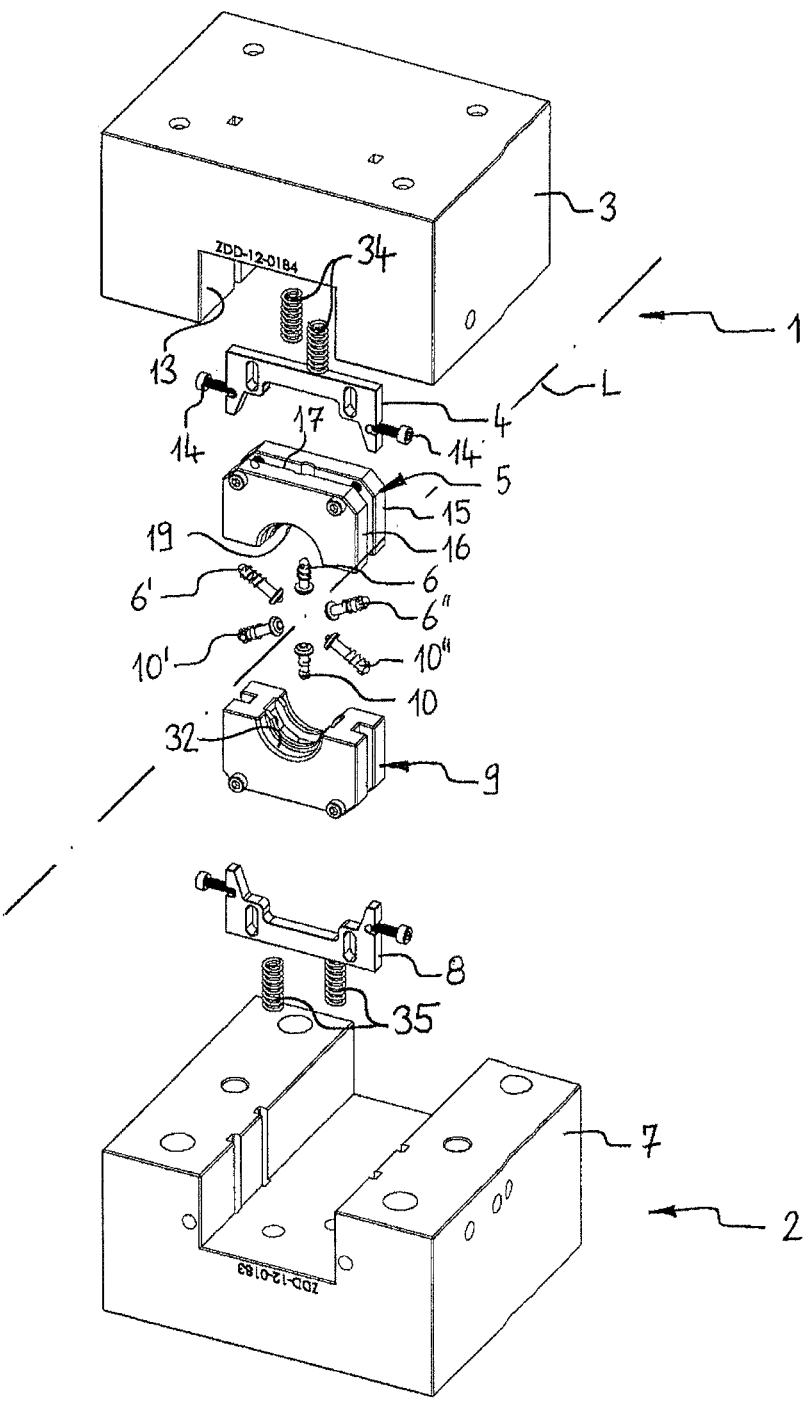
FIG. 1 is a perspective exploded view of the crimping tool according to the invention.

FIGS. 1 to 4 depicting a preferred embodiment of the crimping tool according to the invention is described together. The crimping tool comprises an upper first tool part 1 and a lower second tool part 2. The first tool part 1 and the second tool part 2 are substantially identical in regard to their function and general design. The first tool part 1 and the second tool part 2 can be moved relative to each other. This means that at least one of the first tool part 1 and the second tool part 2 is movable along an actuation axis A. In other words, the first tool part 1 can be moved along the actuation axis A solely, the second tool part 2 can be moved along the actuation axis A solely or both tool parts 1, 2 can be moved along the actuation axis A. In the shown embodiment the actuation axis A is orientated vertically. However, the actuation axis A can also be orientated horizontally or in any other orientation.

The first tool part 1 comprises a first housing 3 which can be attached to a crimping press or crimping machine. The first tool part 1 further comprises a first actuator 4 which is fixed to the first housing 3. In the preferred embodiment according to FIG. 1 the first actuator 4 is replaceably mounted to the first housing 3. However, it is also possible that the first housing 3 itself forms a first actuator 4 integrally. A first crimping die 5, which is also part of a first tool part 1, is movably attached to the first actuator 4 and can be moved linear along the actuation axis A relative to the first actuator 4 and the first housing 3. Alternatively, the first crimping die 5 can also be mounted to the first housing 3. The first tool part 1 further comprises three first crimping elements 6, 6', 6" which are movably guided and received by the first crimping die 5. The first crimping elements 6, 6', 6" are movable in a radial direction with reference to a longitudinal axis L. The longitudinal axis L is arranged perpendicular to the actuation axis A and coincides with the longitudinal axis of a work piece such as a shield connector to be crimped onto the shielding sheath of a shielded cable which is inserted into the crimping tool for crimping. The first crimping elements 6, 6', 6" are pin-shaped movable along different radial axes R, R', R" and are distributed around the longitudinal axis L.

The second tool part 2 is substantially identical to the first tool part 1 and comprises a second housing 7, a second actuator 8, a second crimping die 9 and second crimping elements 10, 10', 10". In regard to the function of the second tool part 2 it is referred to the above description of the first tool part 1.

Figure 2:
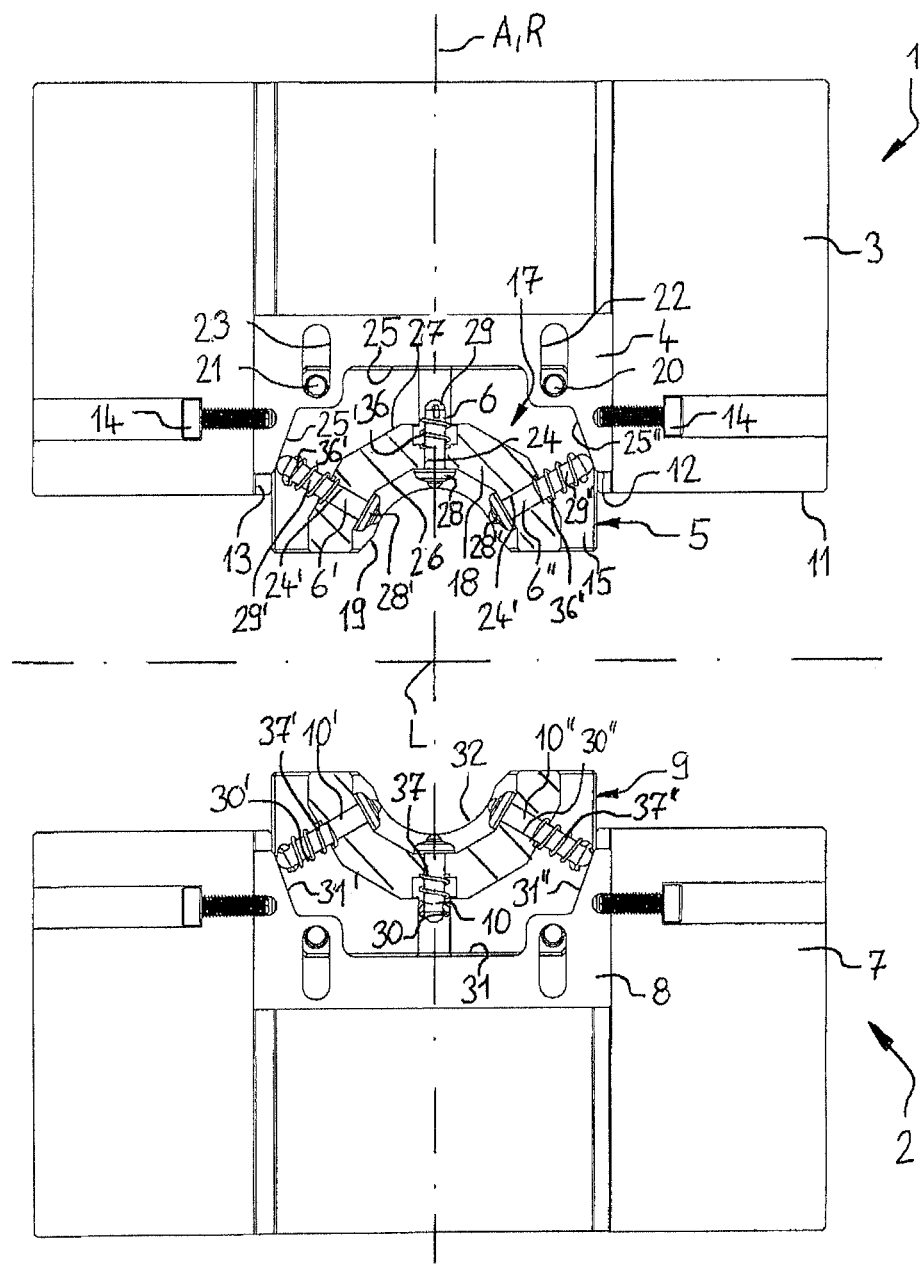
FIG. 2 is a sectional front view of the crimping tool according to FIG. 1 in an open position.
Figure 3:
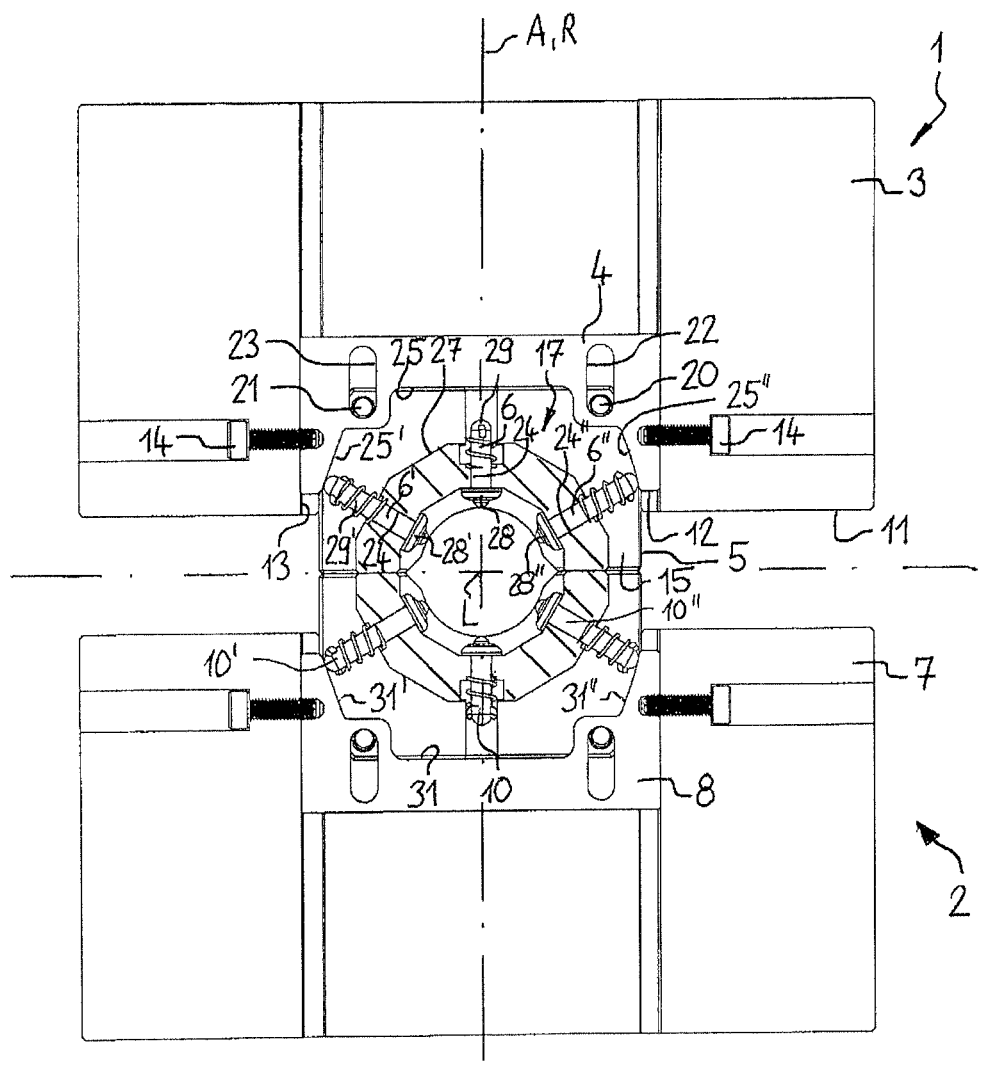
FIG. 3 is a sectional front view of the crimping tool according to FIG. 1 in a closed position.
Figure 4:
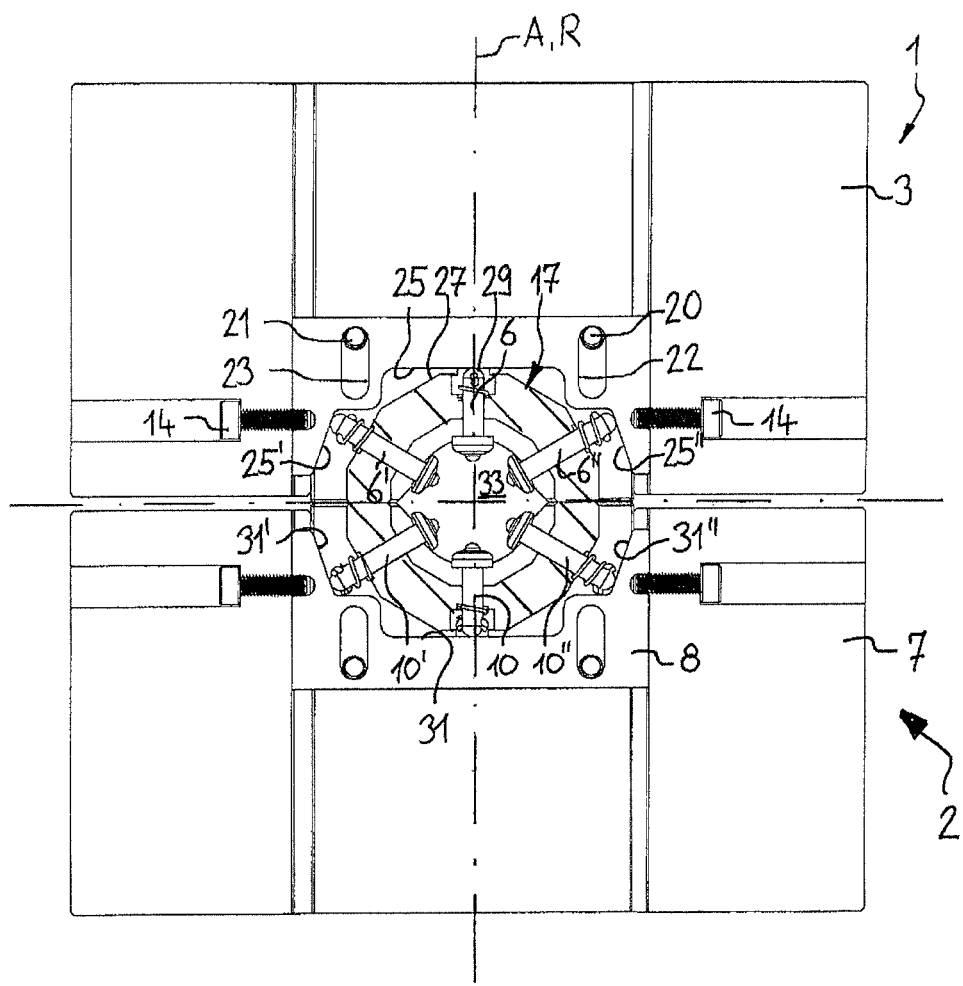
FIG. 4 is a sectional front view of the crimping tool according to FIG. 1 in an actuation position.

The function of the crimping tool is described in particular with respect to FIGS. 2 and 4. In the present embodiment both tool parts 1, 2 are movable along the actuation axis A. The tool parts 1, 2 can reach different position relative to one another. FIG. 2 shows an open position of the tool parts 1, 2 in which the tool parts 1, 2 are spaced apart as well as the crimping dies 5, 9. In the closed position of the tool parts 1, 2 as depicted in FIG. 3 the crimping dies 5, 9 are in contact to each other and have the same positions to the respective actuator 4, 8. as in the open position of the tool parts 1, 2. In the actuated position as shown in FIG. 4 the crimping dies 5, 9 in contact with each other, the housings 3, 7 are proximated as much as possible and the crimping dies 5, 9 have moved with respect to the respective actuators 4, 8 against a spring force of spring means 34, 35, which spring means 34, 35 are biasing the actuators 4, 8 towards the positions shown in FIGS. 2 and 3.

In the open position of the tool parts 1, 2 as shown in FIG. 2 the upper first crimp-ing die 5 projects from a first front face 11 of the first housing 3 and from a first front face 12 of the first crimping die 5 farther than in the actuated position of the tool parts 1, 2 in their actuated position as shown in FIG. 4. To achieve this, the first crimping die 5 is movable along the actuation axis A with respect to the first actuator 4. The first actuator 4 is received within a first receptacle 13, which is formed like a groove in the first housing 3. The first receptacle 13 is orientated parallel to the longitudinal axis L and the first actuator 4 is arranged transversely to the groove (first receptacle 13). The first actuator 4 is formed as a plate orientated perpendicular to the longitudinal axis L. The first actuator 4 is secured to the first housing 3 by bolts 14.

The first crimping die 5 comprises two parallel orientated plates 15, 16 which are spaced from each other forming a gap 17 there between. The plates 15, 16 are integrally connected by a bridge portion 18 having a cross section as can be seen in FIG. 2 with a semi-spherical form. The bridge portion 18 leaves the gap 17 between the plates 15, 16 on the side of the bridge portion 18 opposite to the longitudinal axis L. Towards the longitudinal axis L the bridge portion 18 is formed concave around a first recess 19 of the first crimping die 5 for receiving the work piece to be crimped. The first recess 19 cooperates in the closed position of the tool parts 1, 2 with a second recess 32 of the second crimping die 9 so as to form a receiving hole 33 for securely holding a work piece, such as a shielding contact on a shielded wire, e.g. a twisted pair wire.

The gap 17 receives the plate like first actuator 4 so that the first crimping die 5 is guided on the first actuator 4. For restricting the movement of the first crimping die 5 with respect to the first actuator 4 along the actuation axis A the first actuator 4 comprises two elongated holes 22, 23 which are orientated parallel to the actuation axis A. The elongated holes 22, 23 receive rods 20, 21 said rods 20, 21 are bridging the two plates 15, 16 of the first crimping die 5.

The bridge portion 18 of the first crimping die 5 is provided with three first guiding holes 24, 24', 24", each of which is receiving one of the first crimping elements 6, 6', 6". The first crimping elements 6, 6', 6" are slideable guided within the first guiding holes 24, 24', 24" so that they can move between a retracted position as shown in FIGS. 2 and 3 and an emerged position as shown in FIG. 4. The first crimping elements 6, 6', 6" each have a pin portion 29, which is slideable received within the respective first guiding hole 24, 24', 24", and a pin head 28. The first crimping elements 6, 6', 6" project towards the second tool part 2 from an inner face 26 of the bridge portion 18 with the pin head 28. The pin portions 29 of the first crimping elements 6, 6', 6" project out of the respective first guiding hole 24, 24', 24" on the opposite side of the respective pin head 28. In the retracted position the first crimping elements 6, 6', 6" project over an outer face 27, which is opposite to the inner face 26 of the bridge portion 18, farther than in the emerged position. In other words, in the emerged position the pin head 28 projects farther from the inner face 26 than in the retracted position.

The first guiding holes 24, 24', 24" are distributed over the circumference of the bridge portion 18 and have all different angles to the actuation axis A. In the closed position of the tool parts 1, 2 and in the actuated position of the tool parts 1, 2 the first guiding holes 24 are orientated in a radial direction with respect to the longitudinal axis L. One of the first crimping elements 6 is movable along the actuation axis A which is also orientated radially to the longitudinal axis L and can also be referred to as a radial axis R. The other two first crimping elements 6', 6" are movable along radial axes R', R" which are angled to the actuation axis A and which are orientated in a radial direction with respect to the longitudinal axis L.

The first crimping element 6, which is movable along the actuation axis A, can be referred to as a center crimping element and the two other first crimping elements 6', 6", which are movable along the radial axes R', R", which are angled with respect to the actuation axis A, can be referred to as side crimping elements. The first actuator 4 and the first crimping elements 6 are configured such that a first subset of the first crimping elements 6 and a second subset of the first crimping elements 6', 6" are moved consecutively by moving the first actuator 4 with respect to the first crimping die 5. The first subset of first crimping elements 6 comprises the center crimping element 6 and the second subset of first crimping elements 6 comprises the side crimping elements 6', 6". When the first actuator 4 and the first crimping die 5 are moved relative to each other from the emerged position of the first crimping die 5 as shown in FIG. 3 towards the retracted position of the first crimping die 5 as shown in FIG. 4 the second subset of first crimping elements 6 is moved before the first subset of first crimping elements 6. This means that firstly the side crimping elements are moved for crimping indentions into the work piece before the center crimping element is moved for crimping an indent into the work piece.

The consecutive movement of the first crimping element 6 (center crimping element) is realized by a specific design of the first actuator 4 and a specific orientation of the first crimping elements 6. The first actuator 4 has three first thrust faces 25, 25', 25", each of which cooperates with one of the first crimping elements 6', 6". One of the first thrust faces 25 can be refer to as a center thrust face which is arranged perpendicular to the actuation axis A and which comes into contact with the projecting part of the pin portion 29 of the center crimping element. The other two first thrust faces 25', 25" can be referred to as side thrust faces each of which comes into contact with one of the side crimping elements 6', 6". The side thrust faces 25', 25" are orientated enclosing an acute angle with the actuation axis A. In the closed position of the tool parts 1, 2 the side crimping elements 6 are in contact with the side thrust faces 25', 25". The center crimping element is spaced apart from the center thrust face 25. In order to ensure that all first crimping elements 6 are held in their retracted position the first crimping elements 6 are biased each by first and second spring means 36, 36', 36", 37, 37', 37" towards their retracted position. When moving the first actuator 4 in direction towards the second tool part 2, in other words downwardly in the present embodiment, the side thrust faces 25', 25" slide on the ends of the pin portions 29 of the side crimping elements 6', 6" pushing the side crimping elements 6', 6" inwardly in a radial direction towards the longitudinal axis L against a spring force of the first spring means 36', 36". During the movement of the first actuator 4 the center crimping element 6 comes into contact with the center thrust face 25 so that by further moving down the first actuator 4 the center thrust face 25 pushes down the center crimping element 6 in a radial direction towards the longitudinal axis L against a spring force of the first spring means 36 unless, in the actuated position of the crimping tools 1, 2 as shown in FIG. 4, all first crimping elements 6, 6', 6" are moved to the emerged position.

The second crimping element is configured with respect to the function of moving the second crimping elements 10 by movement of the second actuator 8 with the function of the first tool part 1 so that with respect to the function of the second tool part 2 it is referred to the description of the function of the first tool part 1. Accordingly, the second tool part 2 further comprises second guiding holes 30, 30', 30" and second thrust faces 31, 31', 31", cooperating with the respective second crimping elements 10, 10', 10" al describes in connection with the first tool part 1

What is claimed is:

1. A crimping tool comprising:
    a first tool part having a first crimping die and a plurality of first crimping elements;
    a second tool part having a second crimping die and a plurality of second crimping elements;
    at least one first actuator being movable relative to the first crimping die along an actuation axis perpendicular to a longitudinal axis, wherein said at least one first actuator actuates said first crimping elements moving said first crimping elements in a radial direction; and
    at least one second actuator being movable relative to the second crimping die along said actuation axis, wherein said at least one second actuator actuates said second crimping elements moving said second crimping elements in a radial direction,
    wherein a first subset of the first crimping elements and a second subset of the first crimping elements are moved consecutively with respect to each other by moving the first actuator relative to the first crimping die,
    wherein the at least one first actuator and the at least one second actuator are movable between a preset position and an actuated position and
    wherein the first crimping elements and second crimping elements and the first actuator and second actuator are configured such that during moving the first actuator and second actuator towards their actuated position, the crimping elements movable along radial axes angled to the actuation axis start to move before the crimping elements movable along the actuation axis start to move.

2. The crimping tool according to claim 1, wherein at least one of the first crimping die and the second crimping die is movable in the direction of the actuation axis for opening and closing the crimping dies.

3. The crimping tool according to claim 1, wherein the first crimping elements and second crimping elements are movable between a retracted position and an emerged position.

4. The crimping tool according to claim 1, wherein the first crimping die and the second crimping die each have a recess which together form a receiving hole for holding a work piece to be crimped centered on the longitudinal axis when the crimping dies are in a closed position.

5. The crimping tool claim 1, wherein:
    one of the first crimping elements is movable along the actuation axis, and at least two of the first crimping elements are movable along radial axes angled to the actuation axis, and
    one of the second crimping elements is movable along the actuation axis, and at least two of the second crimping elements are movable along radial axes angled to the actuation axis.

6. The crimping tool according to claim 1, wherein the first crimping elements and second crimping elements and the first actuator and second actuator are configured such that during moving the first actuator and second actuator all of the crimping elements, movable along radial axes angled to the actuation axis, move coincidently and all of the crimping elements, movable along the actuation axis, move coincidently.

7. The crimping tool according to claim 1, wherein:
    the first tool part further comprises a first housing movably receiving the first crimping die and
    the second tool part further comprises a second housing movably receiving the second crimping die.

8. The crimping tool according to claim 1, wherein at least one of the first tool part and the second tool part is movable along the actuation axis between an open position, a closed position and an actuation position.

9. The crimping tool according to claim 8, wherein:
    in the open position of the tool parts the crimping dies are spaced apart from each other and the actuators are in their preset positions, in the closed position of the tool parts the crimping dies are in contact to each other and the actuators are in their preset positions, and in the actuation position of the tool parts the crimping dies are in contact to each other and the actuators are in their actuated positions.

10. The crimping tool according to claim 1, wherein:

the first crimping die comprises a plurality of first guiding holes for receiving the first crimping elements, and the second crimping die comprises a plurality of second guiding holes for receiving the second crimping elements.

11. The crimping tool according to claim 1, wherein for moving the crimping elements the actuators each are provided with at least one thrust face coming into contact with the crimping elements during movement of the actuators towards their actuated position moving the crimping elements towards their emerged positions.

12. The crimping tool according to claim 3, wherein:

the crimping elements are biased towards their retracted position, and the actuators are biased towards their preset position.

13. The crimping tool according to claim 1, wherein a first subset of the second crimping elements and a second subset of the second crimping elements are moved consecutively by moving the second actuator relative to the second crimping die.

* * * * *